(12) United States Patent
Huang

(10) Patent No.: US 10,239,396 B2
(45) Date of Patent: Mar. 26, 2019

(54) MULTI-PURPOSE VEHICLE

(71) Applicant: Andrew Huang, Shanghai (CN)

(72) Inventor: Andrew Huang, Shanghai (CN)

( * ) Notice: Subject to any disclaimer, the term of this patent is extended or adjusted under 35 U.S.C. 154(b) by 0 days.

(21) Appl. No.: 15/558,198

(22) PCT Filed: Mar. 18, 2016

(86) PCT No.: PCT/CN2016/076803
§ 371 (c)(1),
(2) Date: Sep. 14, 2017

(87) PCT Pub. No.: WO2016/150353
PCT Pub. Date: Sep. 29, 2016

(65) Prior Publication Data
US 2018/0072144 A1  Mar. 15, 2018

(30) Foreign Application Priority Data

Mar. 20, 2015 (CN) .......................... 2015 1 0122506

(51) Int. Cl.
*B60J 7/16* (2006.01)
*B62D 25/10* (2006.01)
*B60R 5/04* (2006.01)
*B60J 1/18* (2006.01)

(52) U.S. Cl.
CPC ........... *B60J 7/1642* (2013.01); *B60J 1/1884* (2013.01); *B60J 7/1657* (2013.01); *B60R 5/042* (2013.01); *B62D 25/10* (2013.01)

(58) Field of Classification Search
CPC . B60J 7/16; B60J 7/1628; B60J 7/1642; B60J 7/1657; B60P 3/423; B62D 25/10; B62D 47/003
USPC .................... 296/26.06, 26.07, 106, 216.02
See application file for complete search history.

(56) References Cited

U.S. PATENT DOCUMENTS

2012/0242104 A1* 9/2012 Babbage ................ B60J 7/0046
296/26.06

FOREIGN PATENT DOCUMENTS

| FR | 2821321 A1 * | 8/2002 | ............. B60P 3/423 |
| FR | 2821322 A1 * | 8/2002 | ............. B60P 3/423 |
| WO | WO-2013186592 A1 * | 12/2013 | ............ B62D 47/003 |

* cited by examiner

*Primary Examiner* — Jason S Daniels
(74) *Attorney, Agent, or Firm* — Luoh J. Wu; Continent Patent Office LLP

(57) ABSTRACT

A multi-purpose vehicle having a fastback state and a wagon state, which comprises a vehicle body, a main liftback body and a first driving device. The vehicle body comprises a roof, a C-pillar and a tail. The main liftback body is movably connected with the roof and the tail. The first driving device is located in the vehicle body and is connected with the main liftback body, so as to drive the main liftback body to move relative to the C-pillar, therefore the multi-purpose vehicle can be converted between the fastback state and the wagon state.

7 Claims, 18 Drawing Sheets

MULTI-PURPOSE VEHICLE

TECHNICAL FIELD

The invention relates to a multi-purpose vehicle, in particular to a multi-purpose vehicle with a fastback state and a wagon state.

BACKGROUND TECHNOLOGY

In general, a vehicle with a better aerodynamic performance (such as: sports car), has the characteristics of fuel saving, high speed, etc., but the interior space is relatively narrow, so the available space for carrying goods inside is also very limited. On the other hand, the interior space of a wagon is relatively wide, but the aerodynamic characteristic is relatively poor, so it consumes more fuel, therefore, it is necessary to provide a vehicle with better aerodynamic characteristics, and also relatively generous interior space, so users can adjust the states of the vehicle according to needs, which solves the problems existed in the prior art.

THE INVENTION

The main purpose of the invention is to provide multi-purpose vehicle with a fastback state and a wagon state.

In order to achieve the goal, the multi-purpose vehicle provided by the invention has a fastback state and a wagon state. The multi-purpose vehicle comprises a vehicle body, a main liftback body and a first driving device. The vehicle body comprises a roof, a C-pillar and a tail. The main liftback body is movably connected with the roof and the tail. The first driving device is located in the vehicle body and is connected with the main liftback body, so as to drive the main liftback body to move relative to the C-pillar, therefore the multi-purpose vehicle can be converted between the fastback state and the wagon state.

By means of the design, when the multi-purpose vehicle is in fastback state, the wind resistance of the vehicle can be reduced, therefore the fuel saving goal can be achieved; and when the multi-purpose vehicle is in wagon state, the available space inside the vehicle can be expanded. Compared with the prior arts, the nonstructural moving panels in the main liftback body improved by this invention, not only maintain good gaps (shut line), but also hide the linking hinges completely, therefore provide a better integrated exterior.

ACCOMPANYING DRAWINGS

THE DRAWING MARKS ARE AS FOLLOWS

Figure 1:
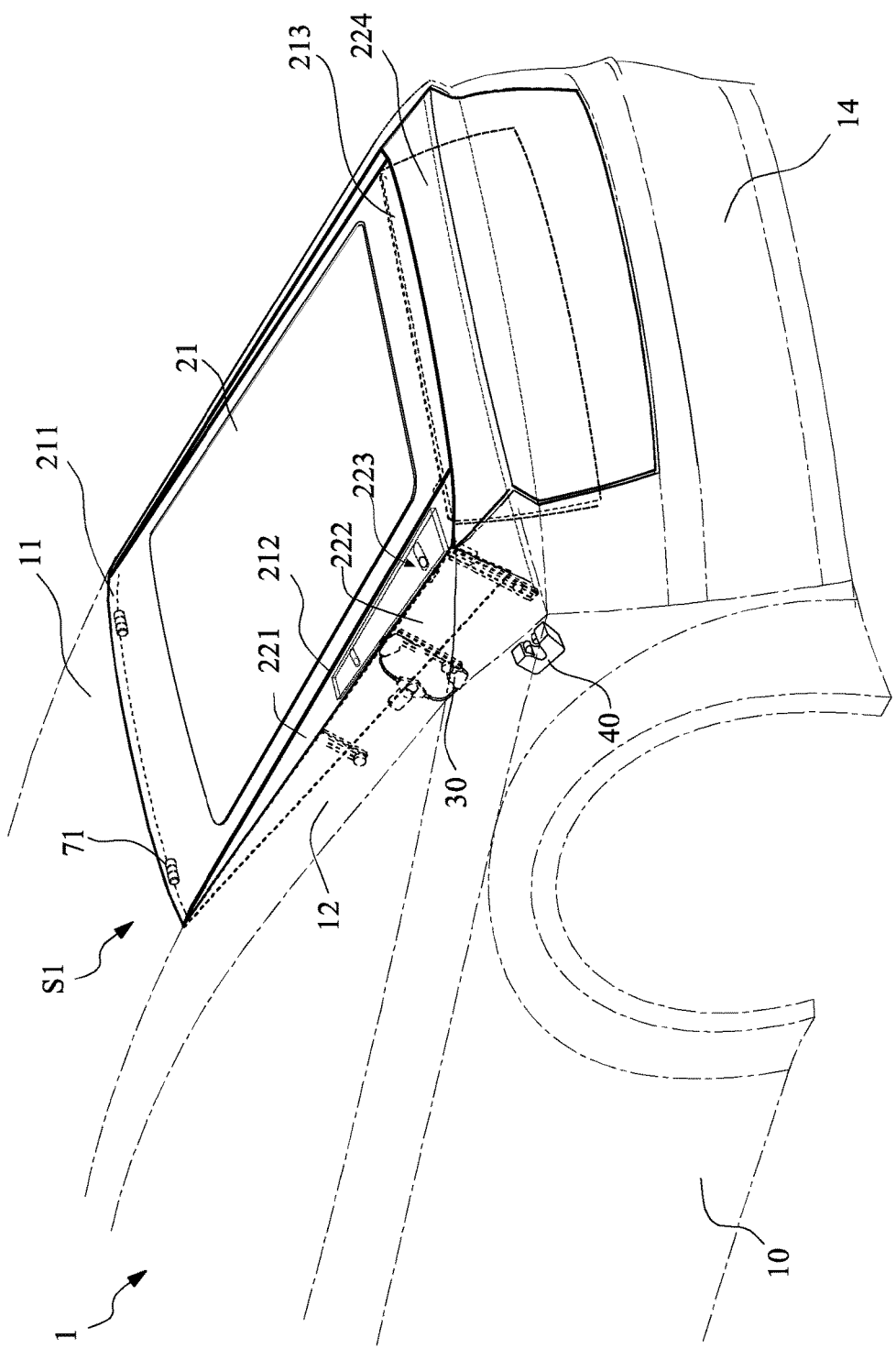
FIG. 1 is a schematic diagram of first embodiment of a multi-purpose vehicle in fastback state.

| | |
|---|---|
| Multi-purpose vehicle 1, 1a and 1b | Vehicle body 10 |
| Roof 11 | C-pillar 12 |
| Tail 14 | Main liftback body 20 |
| Main body 21 | Engaging end 211 |
| First end 212 | Free end 213 |
| Moving assembly 22 | First moving panel 221 |
| First connecting end 2211 | Second connecting end 2212 |
| Second moving panel 222 | Third connecting end 2221 |
| Fourth connecting end 2222 | Linkage device 223 |
| Sliding surface 2230 | Linkage piece 2231 |
| Linkage rod 2232 | Tailgate window 224 |
| First driving device 30, 30a and 30b | Latch 40 |
| Second driving device 50 and 50a | First hinges 71 |
| Second hinges 72 | Rubber strips 90 |
| Fastback State S1 | Wagon state S2 |

Specific Implementation Mode

The technical content of the invention can be better understood by the aid of the methods, and the specific examples are as follows. Please refer to FIGS. 1-7 for the first embodiment of the multi-purpose vehicle according to the present invention.

Figure 2:
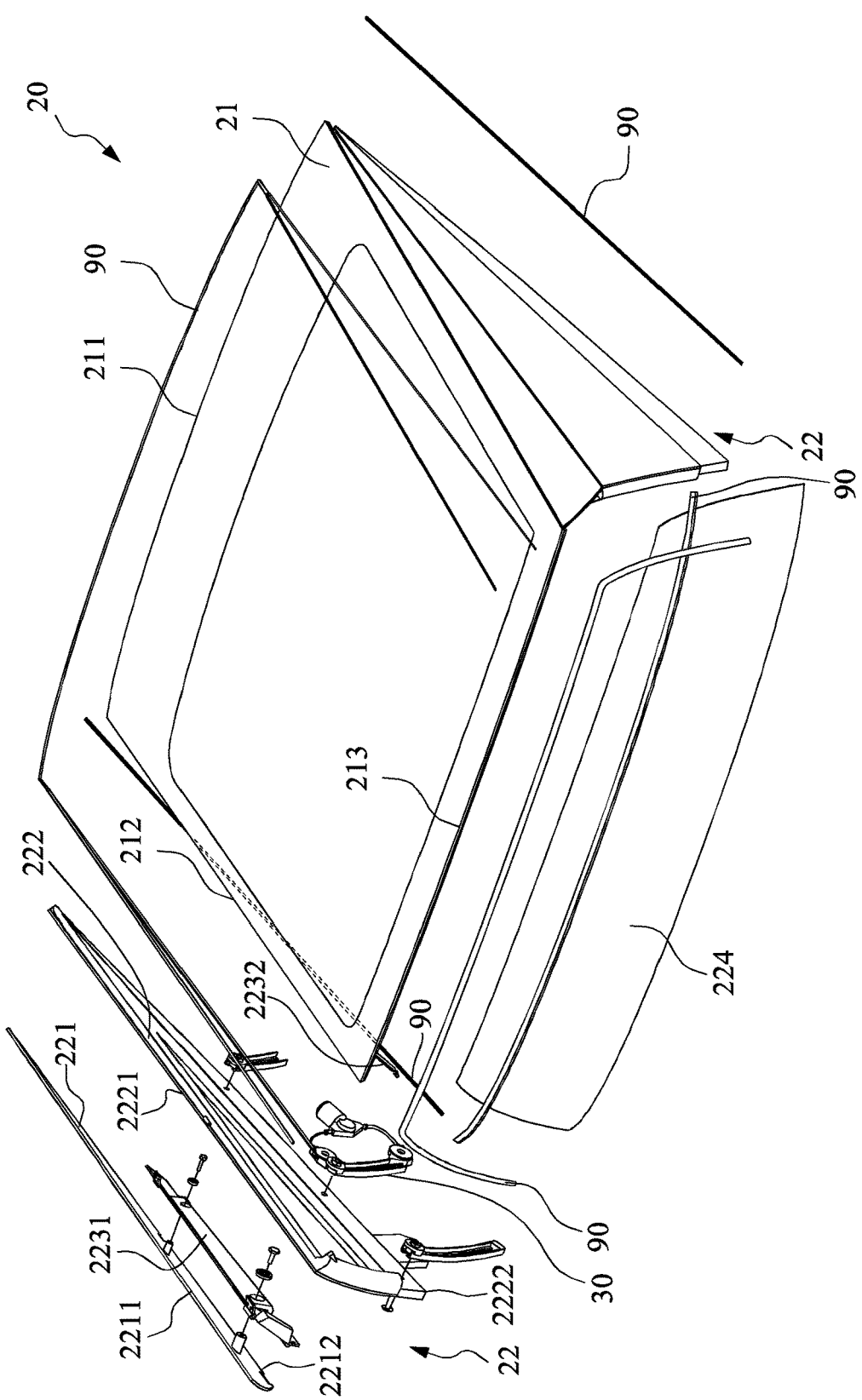
FIG. 2 is a structural exploded view of an embodiment of the main liftback body according to the present invention.
Figure 4:
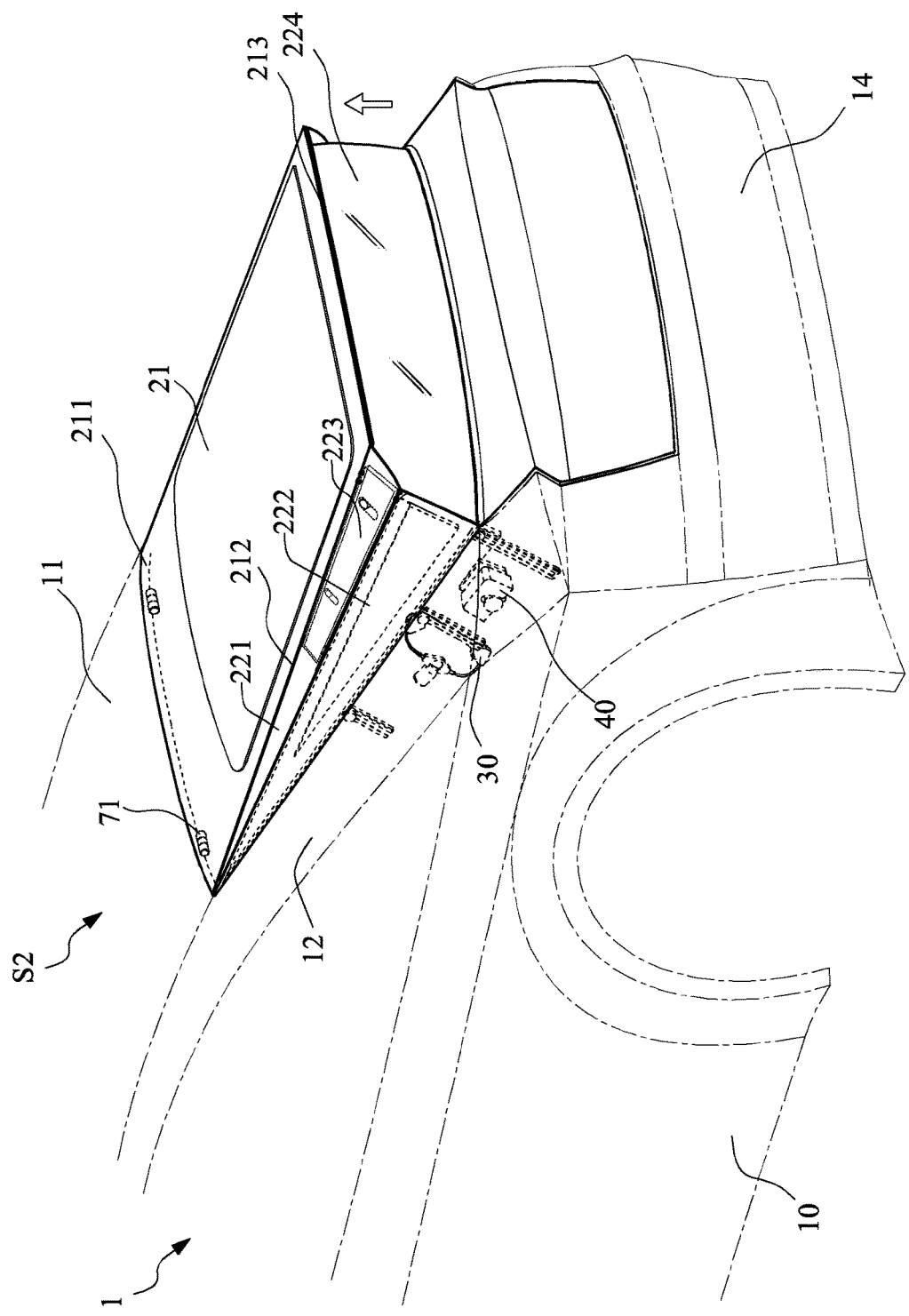
FIG. 4 is a schematic diagram of a first embodiment of a multi-purpose vehicle in wagon state.

As shown in FIG. 1 and FIG. 2, the multi-purpose vehicle 1 comprises a vehicle body 10; a main liftback body 20 and a first driving device 30, wherein the vehicle body 10 comprises a roof 11, a C-pillar 12 and a tail 14, the main liftback body 20 is movably connected with the roof 11 and the tail 14, and the first driving device 30 located in the vehicle body 10 is connected with the main liftgate body 20, to drive the main liftgate body 20 to move up and down relative to the C-pillar 12, so that the multi-purpose vehicle 1 can be converted between a fastback state S1 (FIG. 1) and a wagon state S2 (FIG. 4). It should be noted that, in the embodiment, the multi-purpose vehicle 1 is a passenger vehicle and comprises a control system which controls the first driving device 30 (such as: a starting button or an electrical connection system), and a latch 40. Also, in the invention suitable device for the first driving device 30 can be steel wires, actuators, or window regulators, but the control system, steel wires, latches, actuators and window regulators are all prior arts, not the focus of this improvement, therefore will not be described in details.

As shown in FIG. 1 and FIG. 2, the main liftback body 20 includes a main body 21 and a moving assembly 22, in this embodiment, the main body 21 is located at the rear windshield of the vehicle, the main body 21 comprises an engaging end 211, a first end 212 and a free end 213, wherein the engaging end 211 is pivotally connected with the roof 11 by the first hinges 71, the first end 212 is connected with the moving assembly 22, the moving assembly 22 is connected with the first driving device 30. The first driving device 30 enables the moving assembly 22 to move up and down relative to the C-pillar 12, and also drive the main body 21 to move relative to the roof 11, so that the multi-purpose vehicle 1 can be converted between the fastback state S1 (FIG.) and the wagon state S2 (FIG. 4).

Figure 5:
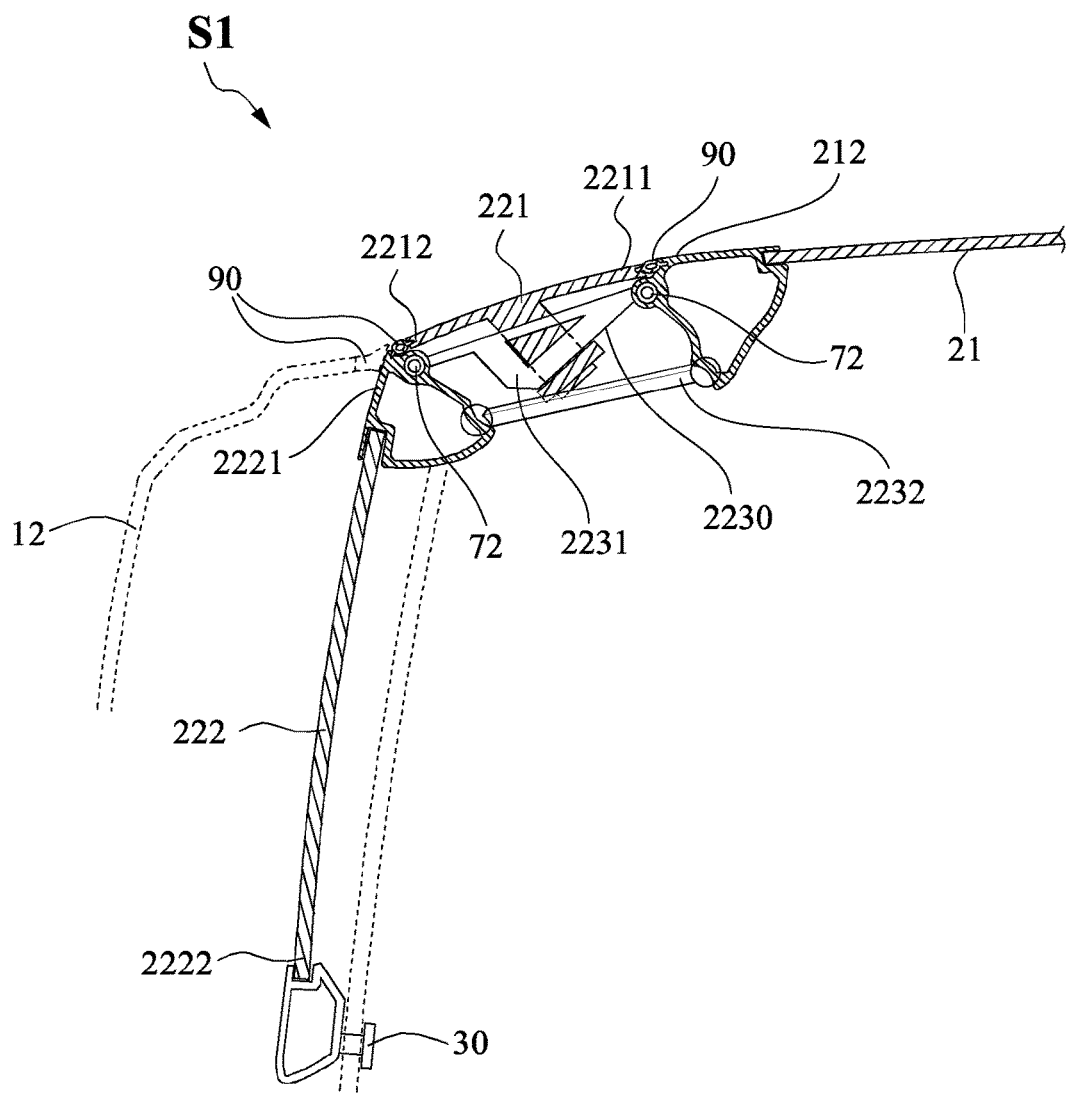
FIG. 5 is a side section view of a first embodiment of a first moving panel and a second moving panel in fastback state.
Figure 6:
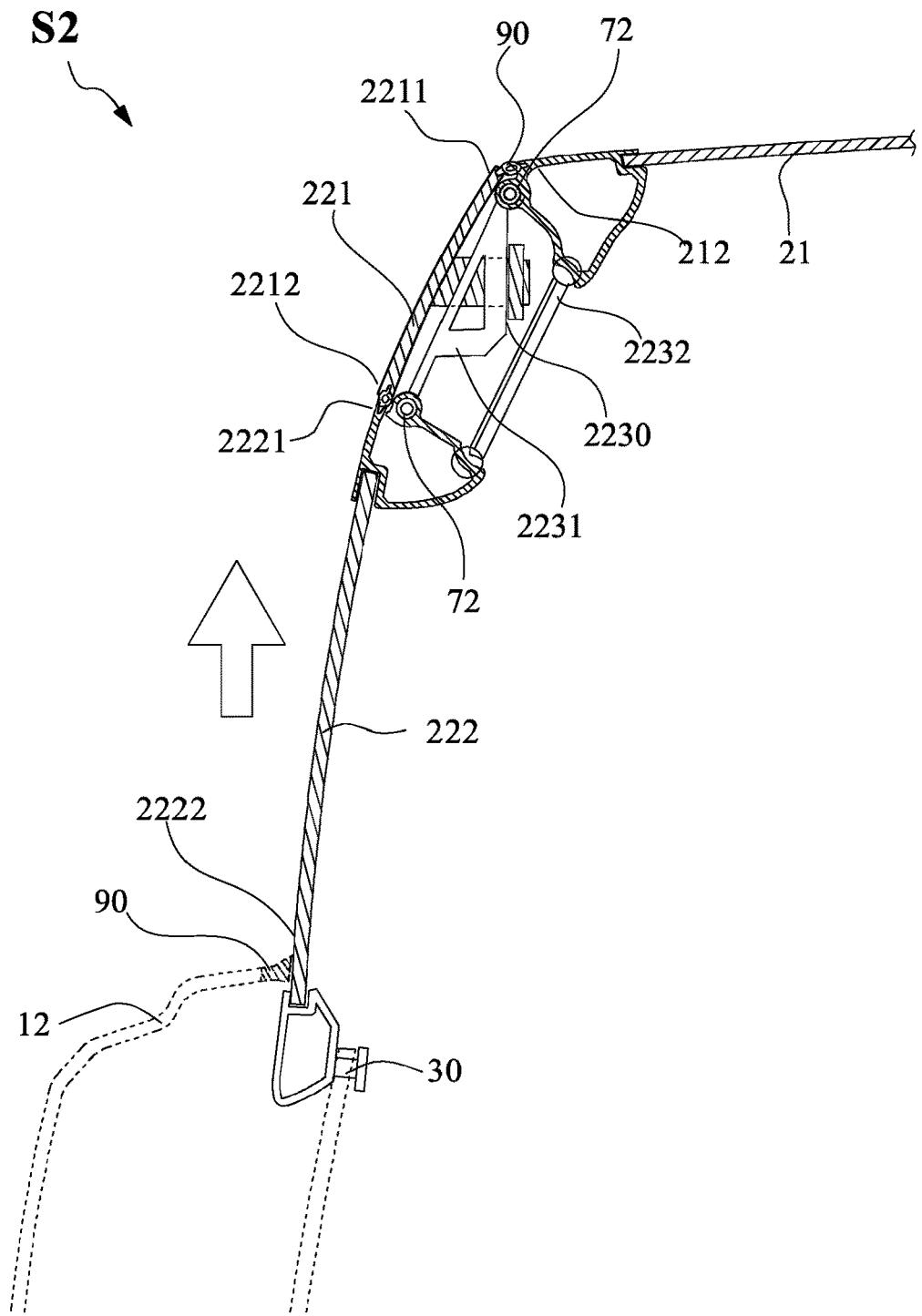
FIG. 6 is a side section view of a first embodiment of a first moving panel and a second moving panel in wagon state.

As shown in FIG. 1 and FIG. 2, in the embodiment, the moving assembly 22 comprises a first moving panel 221, a second moving panel 222, a linkage device 223 and a tailgate window 224, the first moving panel 221 and the second moving panel 222 are all triangular, and the tailgate window 224 is in a trapezoid shape and can be stored in the tail 14, however, the invention is not limited to this embodiment. As shown in FIG. 2, FIG. 5 and FIG. 6, the linkage device 223 comprises a linkage piece 2231 and a linkage rod 2232. The linkage piece 2231 is in contact with the first moving panel 221 over a sliding surface 2230, so that the first moving panel 221 can be positioned. In this embodiment, the linkage device 223 is connected to the main body 21 and the second moving panel 222 by hinges and spherical joints. The first moving panel 221 is connected to the main body 21 and the second moving panel 222 by rubber strips 90. In this improved hidden hinge structure, the linkage device 223 is the main actuator for the motion of the moving assembly 22, in the embodiment the function of the first moving panel 221 is for waterproofing and as a cover for linkage device 223.

As shown in FIG. 1 and FIG. 5, the first moving panel 221 includes a first connecting end 2211 and a second connecting end 2212, the first connecting end 2211 is connected with the first end 212 of the main body 21. And when the multi-purpose vehicle 1 is in fastback state S1, the first moving panel 221 and the main body 21 all face upwards, and the second connecting end 2212 is in contact with the C-pillar 12, while the second moving panel 222 is contained in the vehicle body 10, meanwhile, the tailgate window 224 is also contained in the tail 14. As shown in FIG. 2 and FIG. 6, the second moving panel 222 in this embodiment comprises a third connecting end 2221 and a fourth connecting end 2222, as shown in FIG. 6, when the multi-purpose vehicle 1 is in wagon S2, the first moving panel 221 and the second moving panel 222 are all facing sideways to the vehicle body 10 at the same time, and the first driving device 30 drives the second moving panel 222 upwards relative to the C-pillar 12, till the fourth connecting end 2222 is connected with the C-pillar 12.

Figure 7:
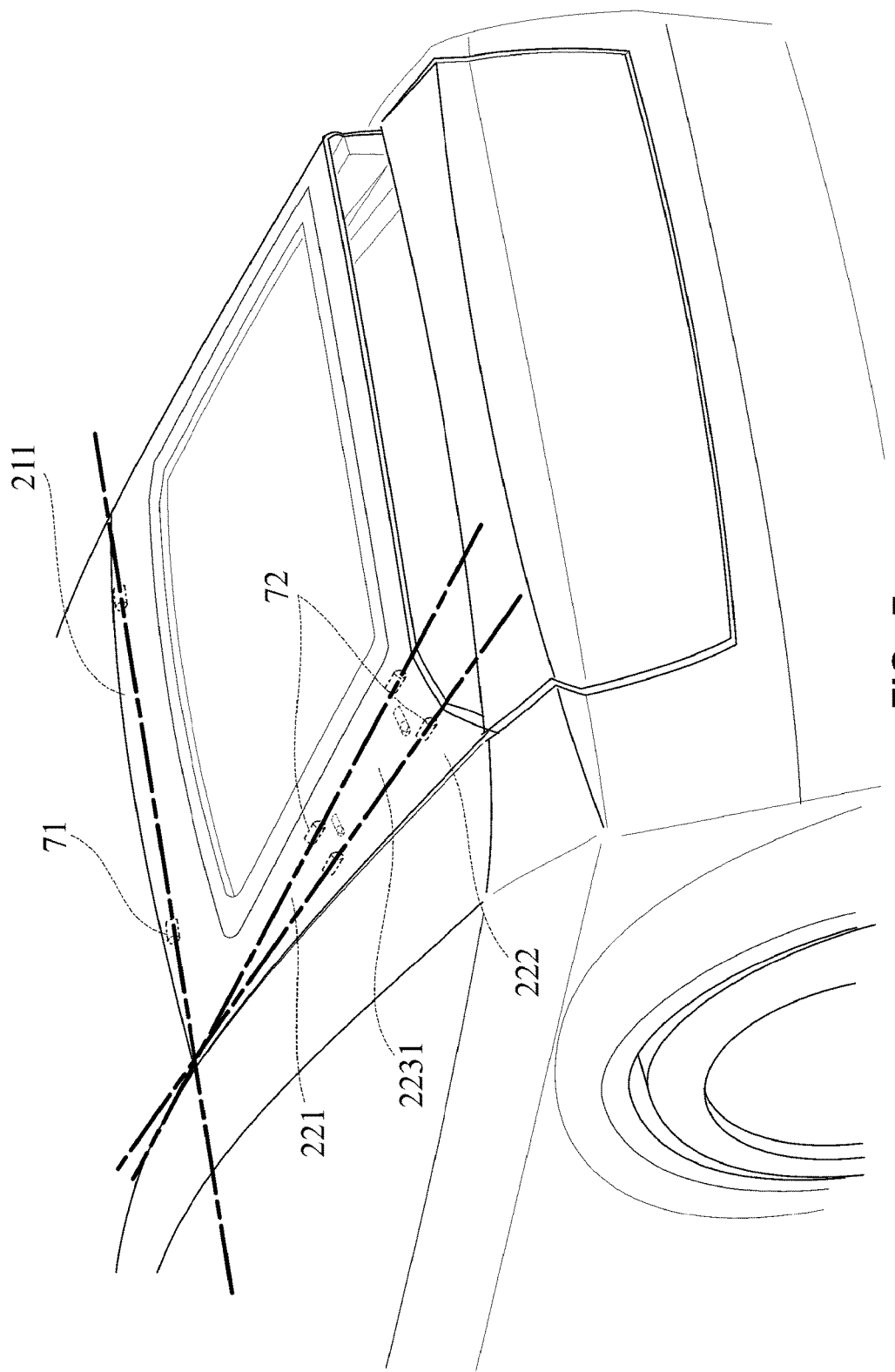
FIG. 7 is a schematic diagram of the alignment of the hinges in the first embodiment of a multi-purpose vehicle.

As shown in FIG. 2, in the embodiment, there is one moving assembly 22 on each side of the main body 21, and a plurality of rubber strips 90 are arranged on the multi-purpose vehicle 1, to allow the first moving panel 221, the second moving panel 222 and the tailgate window 224 to be locked in when moved to defined positions, this is to ensure that the overall sealing performance of the multi-purpose vehicle 1 will stay intact, after lifting the main liftgate body 20 up and down. As shown in FIG. 5 and FIG. 6, in the embodiment, the first connecting end 2211 and the second connecting end 2212 of the first moving panel 221 are all connected through waterproof rubber strips, therefore the functions of the first moving panel 221 are to close the body's opening and to cover linkage device 223 (for example, linking hinges), while all the stress is carried by the linkage device 223. In addition, in the embodiment, as shown in FIG. 2, the first driving device 30 is connected to the second moving panel 222, so as to drive the second moving panel 222 to move up or down relative to the C-pillar 12, the first driving device 30 of the embodiment is a window regulator with three rails. In this embodiment, the linkage piece 2231 is pivotally connected to the second moving panel 222 by a plurality of second hinges 72, the second hinges 72 are arranged on both sides of the linkage piece 2231, as shown in FIG. 7, the axes of the second hinges 72 intersect at a point, which lies on the axis of the first hinges 71 of the engaging end 211. This design ensures that both the first connecting end 2211 and the second connecting end 2212 of the first moving panel 221 would maintain consistent gaps (shut line), critical for good waterproofing.

Figure 3:
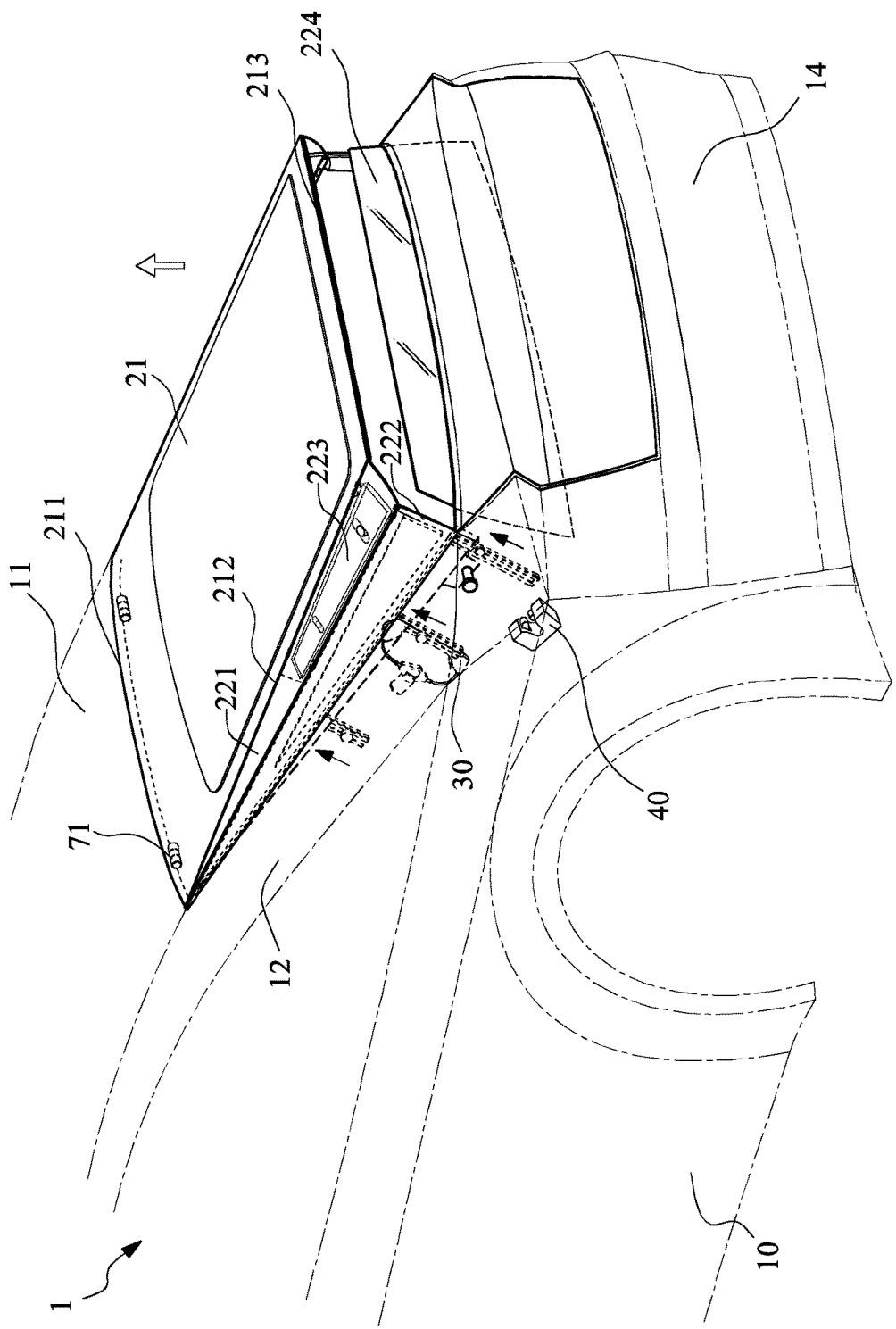
FIG. 3 is a schematic diagram of a multi-purpose vehicle according to the first embodiment of the invention, transforming from fastback state to wagon state.

As shown in FIG. 1 and FIG. 5, when the multi-purpose vehicle 1 is in fastback state S1, the first moving panel 221 is connected with the C-Pillar 12, a gap between the main body 21 and the C-Pillar 12 is filled through the design of the first moving panel 221. As shown in FIG. 3, when the multi-purpose vehicle 1 is converted into a wagon state S2 from fastback state S1, the first driving device 30 drives the second moving panel 222 to move upwards, the main body 21 is also driven to move upwards, until the second moving panel 222 is exposed out of the vehicle body 10, and the tailgate window 224 is connected with the free end 213 to form a wagon state S2 as shown in FIG. 4.

For the following, please refer to FIGS. 8-15 for the second embodiment of the multi-purpose vehicle according to the present invention.

Figure 8:
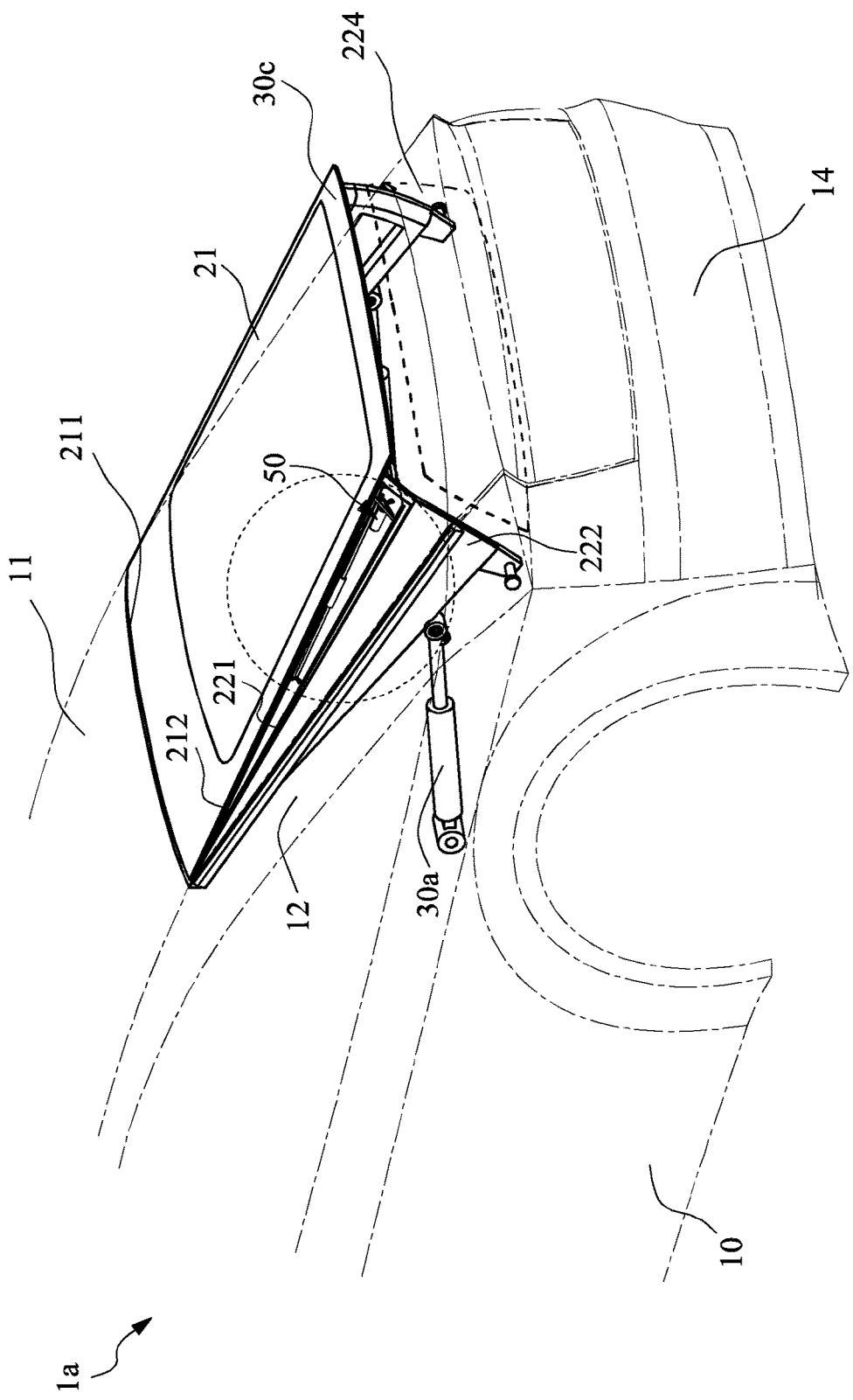
FIG. 8 is a schematic diagram f a second embodiment of a multi-purpose vehicle.
Figure 9:
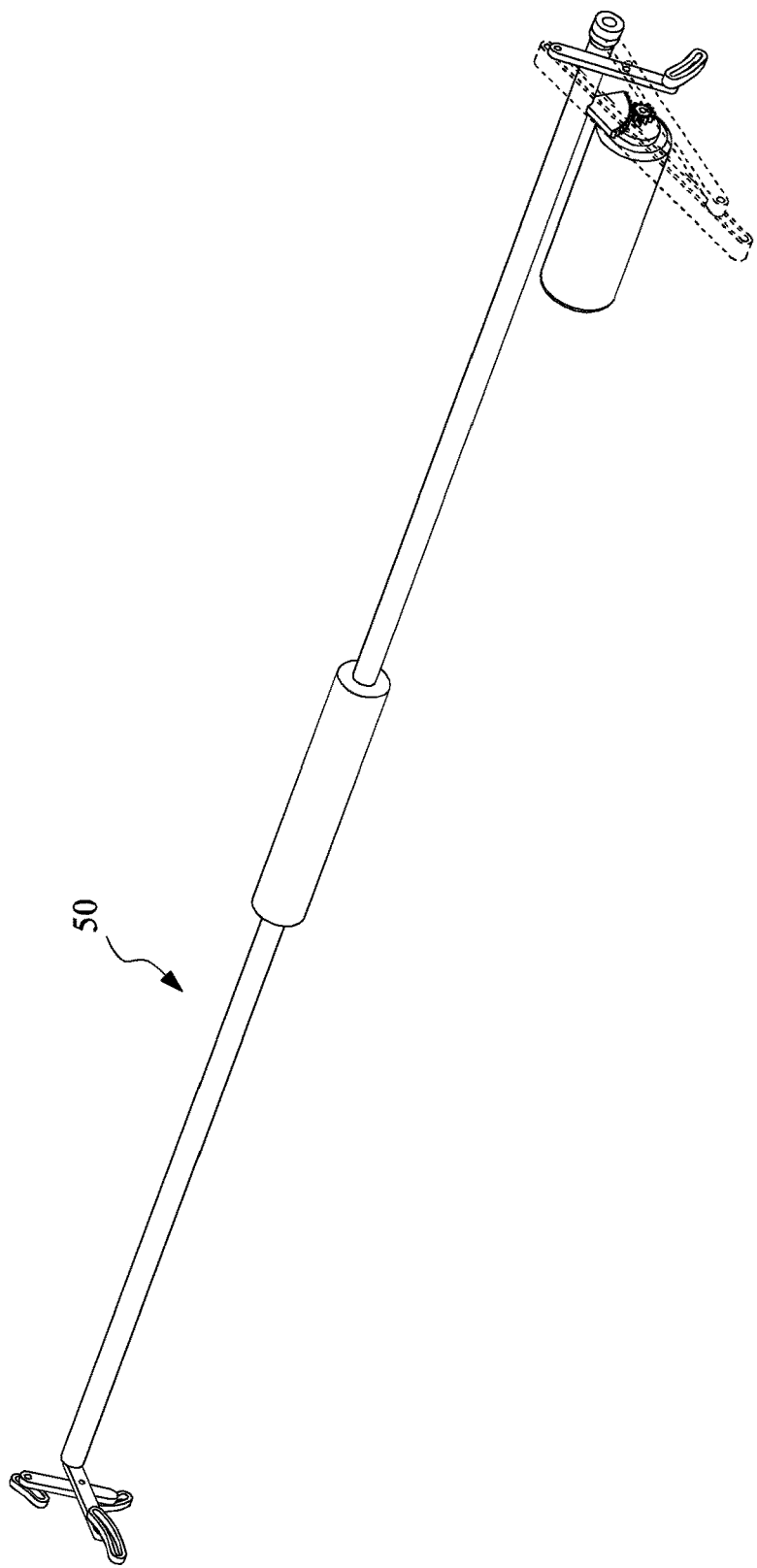
FIG. 9 is a schematic diagram of an embodiment of a second driving device.
Figure 10:
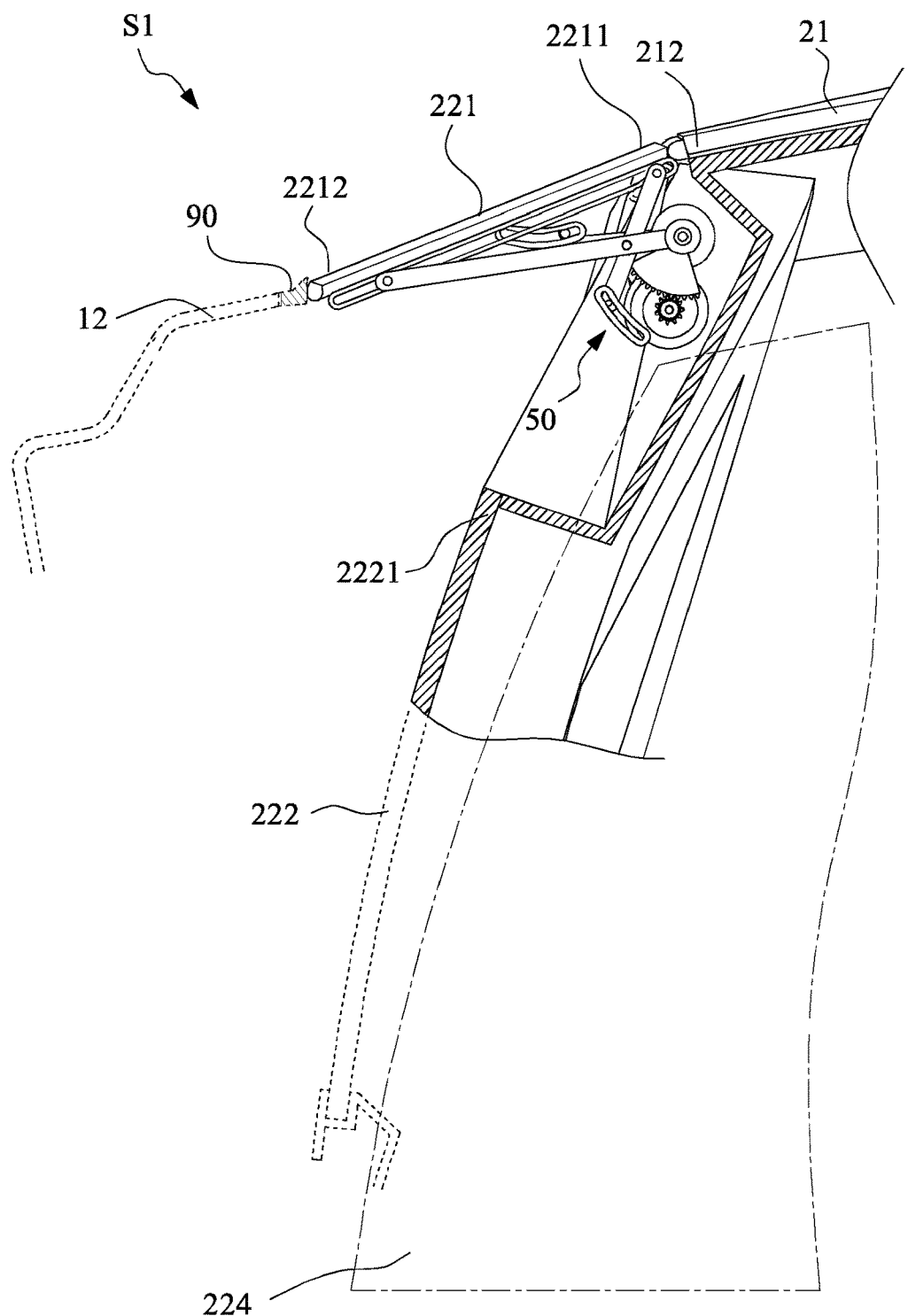
FIG. 10 is a side section view of a second embodiment of a first moving panel and a second moving panel in fastback state.

As shown in FIG. 8 and FIG. 9, in the second embodiment, the second moving panel 222 of the multi-purpose vehicle 1a is relatively sill to the main body 21 (one-piece), and the multi-purpose vehicle 1a further comprises a second driving device 50 as shown in FIG. 10, the second driving device 50 is arranged between the first moving panel 221 and the second moving panel 222 to drive the first moving panel 221. In the embodiment, the second driving device 50 is similar to a gear type car window regulator, by means of this design, the first moving panel 221 can be selectively connected to the C-pillar 12 (FIG. 10), or the third connecting end 2221 of the second moving panel 222 (FIG. 12), and the first driving device 30a of the embodiment is an actuator that is connected to the second moving panel 222, for driving the second moving panel 222 to move up or down relative to the C-pillar 12.

Figure 11:
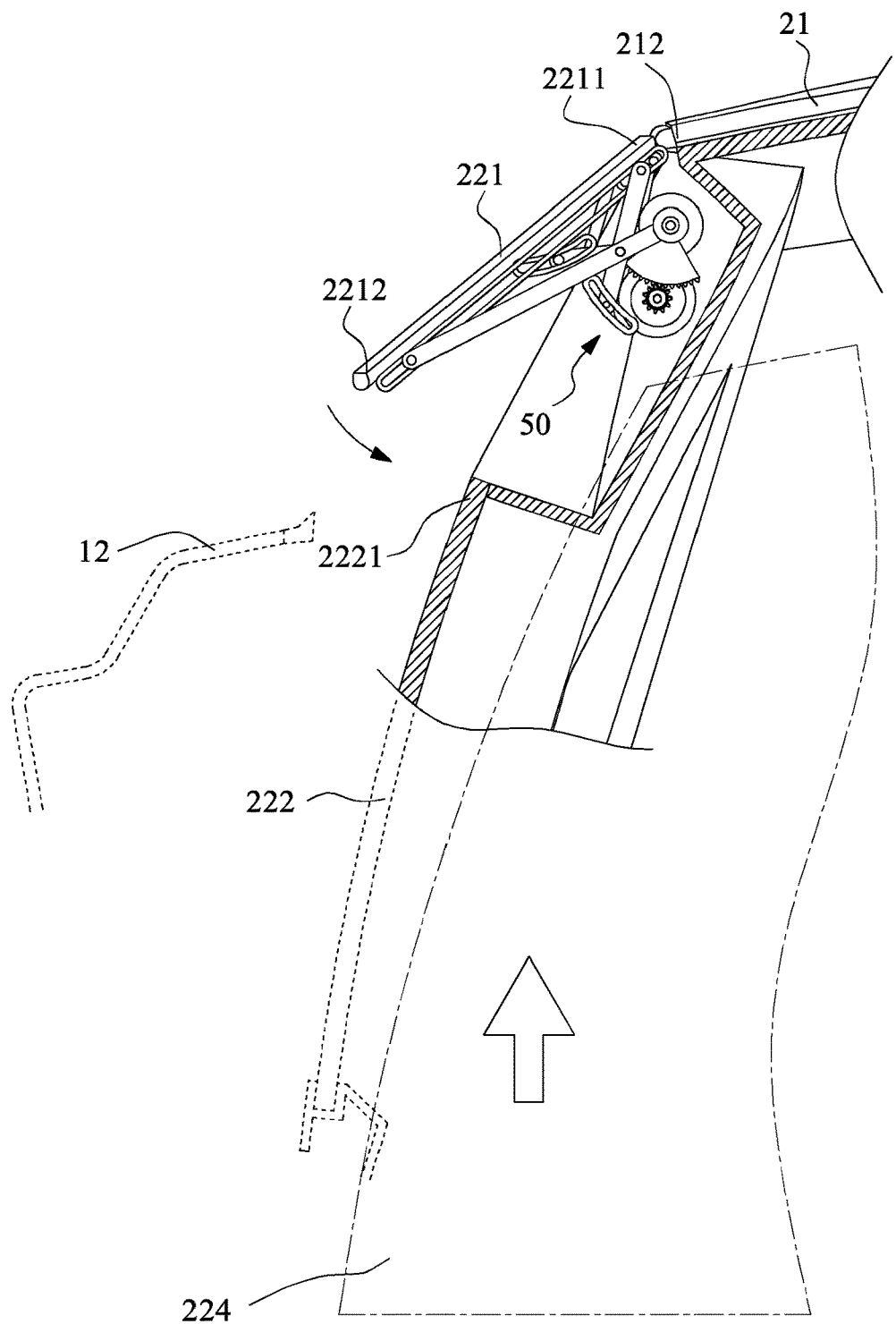
FIG. 11 is a side section view of a second embodiment of a first moving panel and a second moving panel being converted from fastback state to wagon state.
Figure 12:
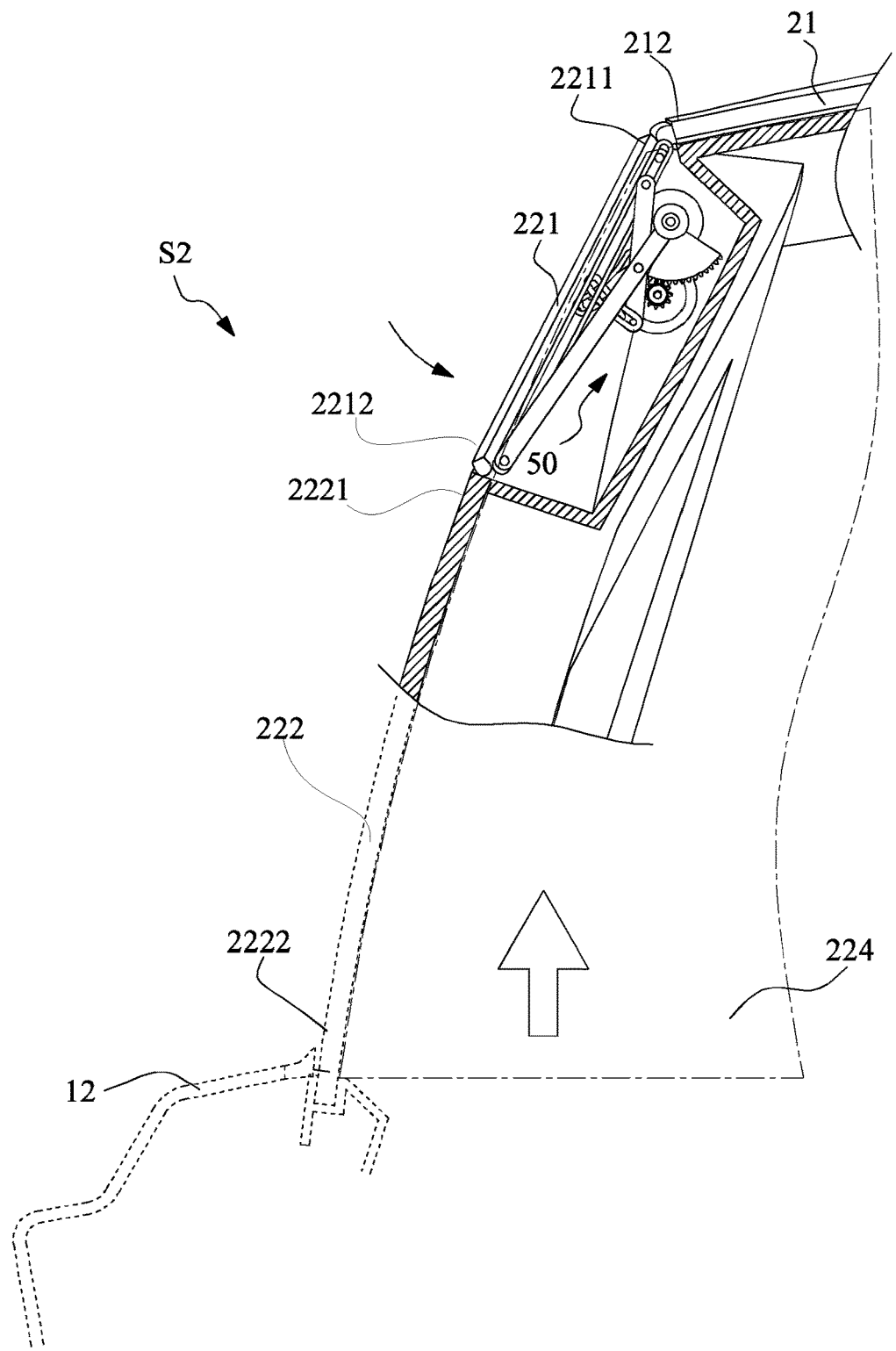
FIG. 12 is a side section view of a second embodiment of a first moving panel and a second moving panel in wagon state.
Figure 13:
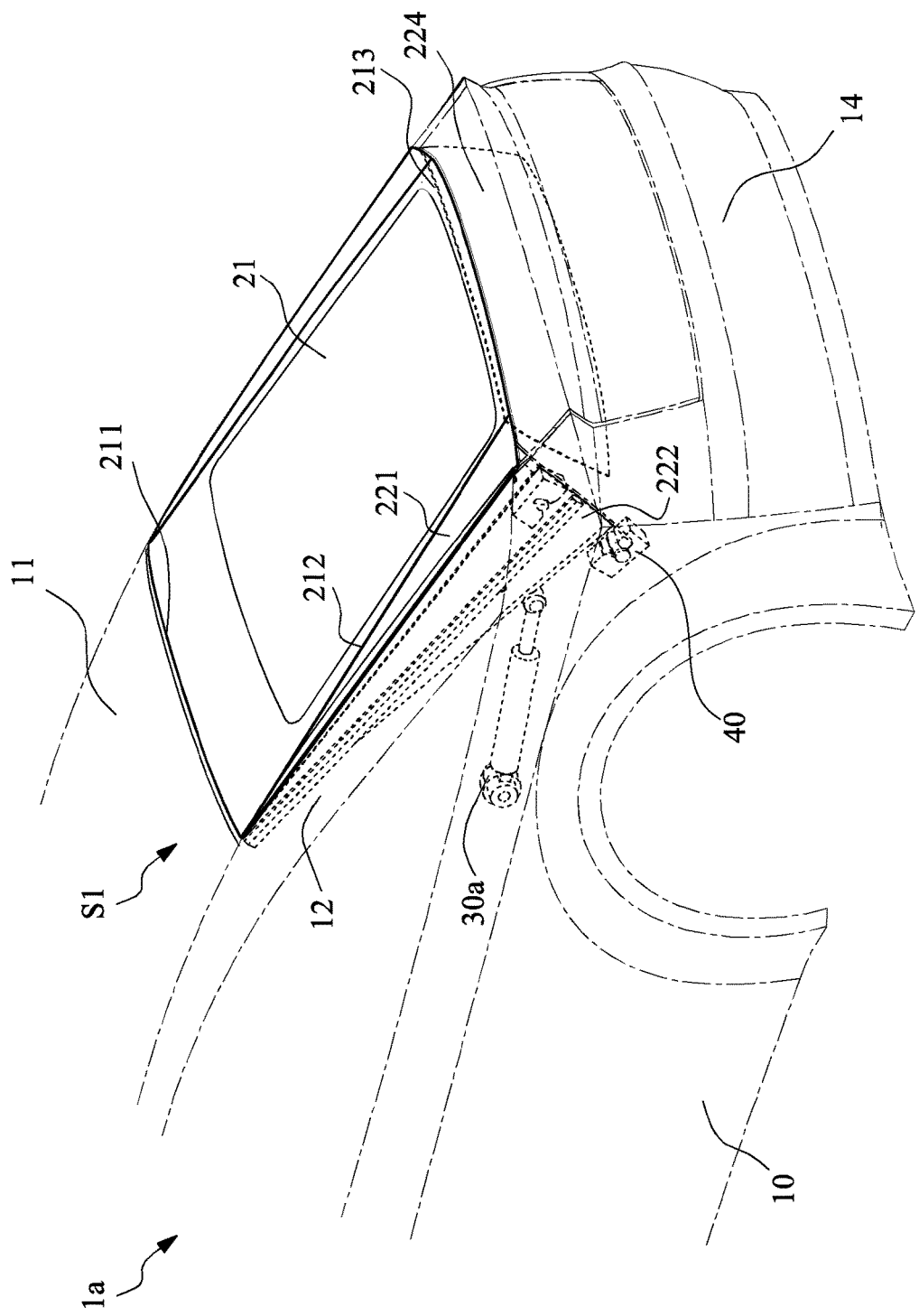
FIG. 13 is a schematic diagram, of a second embodiment of the multi-purpose vehicle in fastback state.
Figure 14:
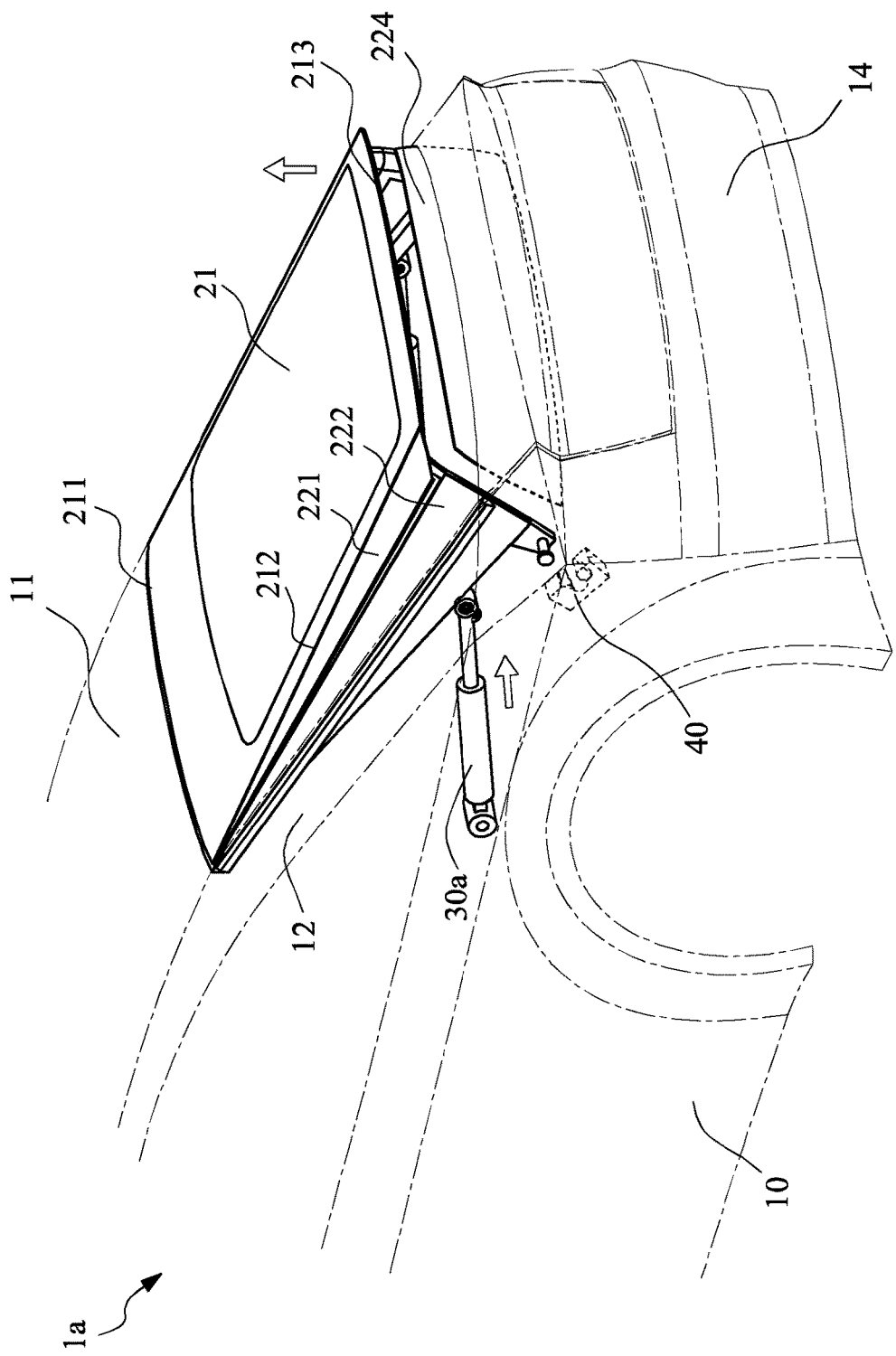
FIG. 14 is a schematic diagram of a second embodiment of the multi-purpose vehicle converted from fastback state to wagon state.
Figure 15:
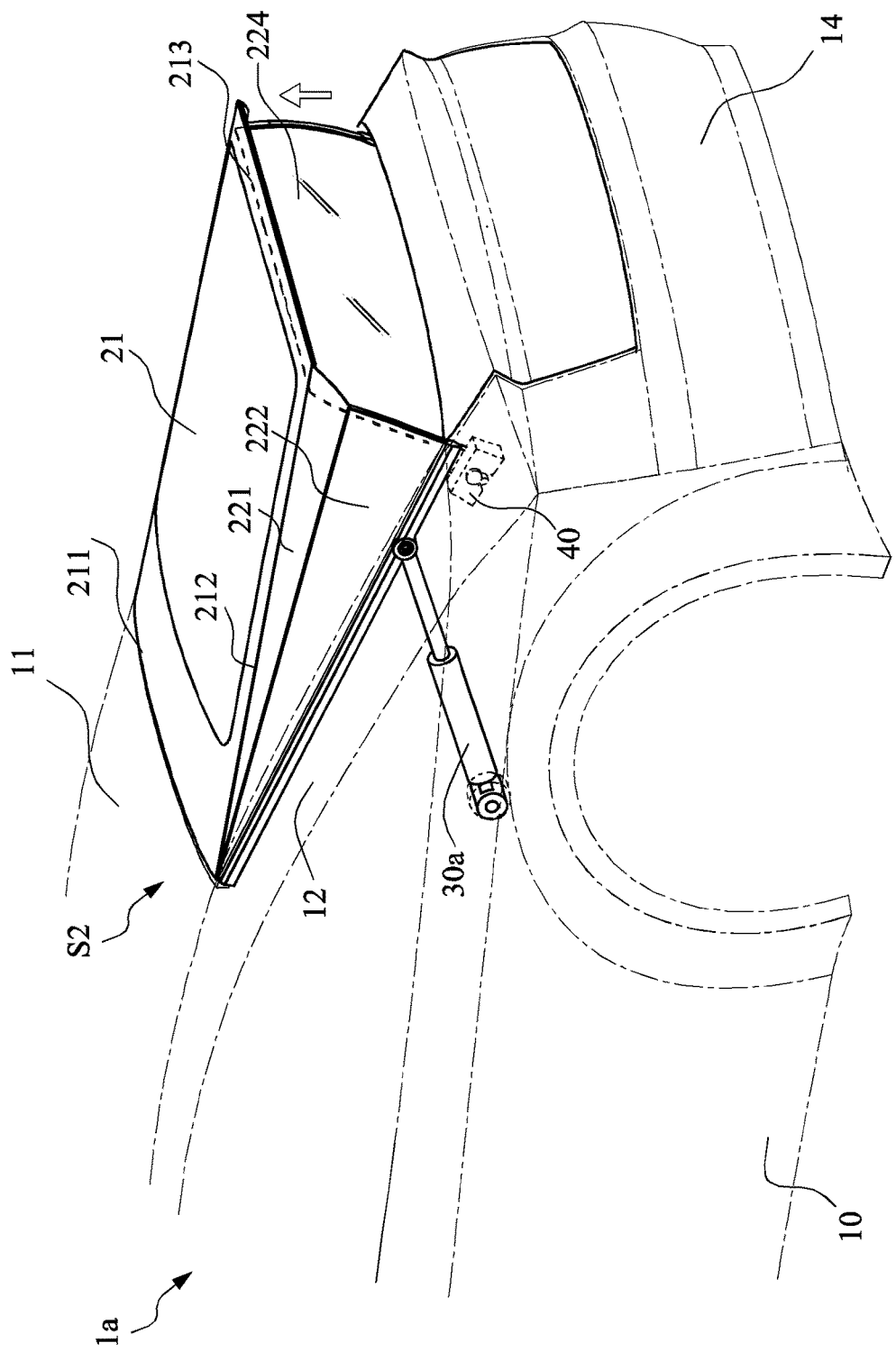
FIG. 15 is a schematic diagram of a second embodiment of the multi-purpose vehicle in wagon state.

As shown in FIG. 10 and FIG. 13, when the multi-purpose vehicle 1a is in fastback state S1, the second connecting end 2212 is connected with the C-pillar 12, at the moment, the second connecting end 2212 of the first moving panel 221 is positioned relatively away from the third connecting end 2221. As shown in FIG. 11 and FIG. 14, when the multi-purpose vehicle 1a is converted into wagon state S2 from fastback state S1, the second connecting end 2212 is driven gradually close to the third connecting end 2221 by the second driving device 50, until being in contact with the third connecting end 2221, meanwhile, the driving device 30a also drives the second moving panel 222 to move up, until the second moving panel 222 is exposed out of the vehicle body 10, and the fourth connecting end 2222 is connected with the C-pillar 12, to form the wagon state S2 as shown in FIG. 12 and FIG. 15.

Figure 16:
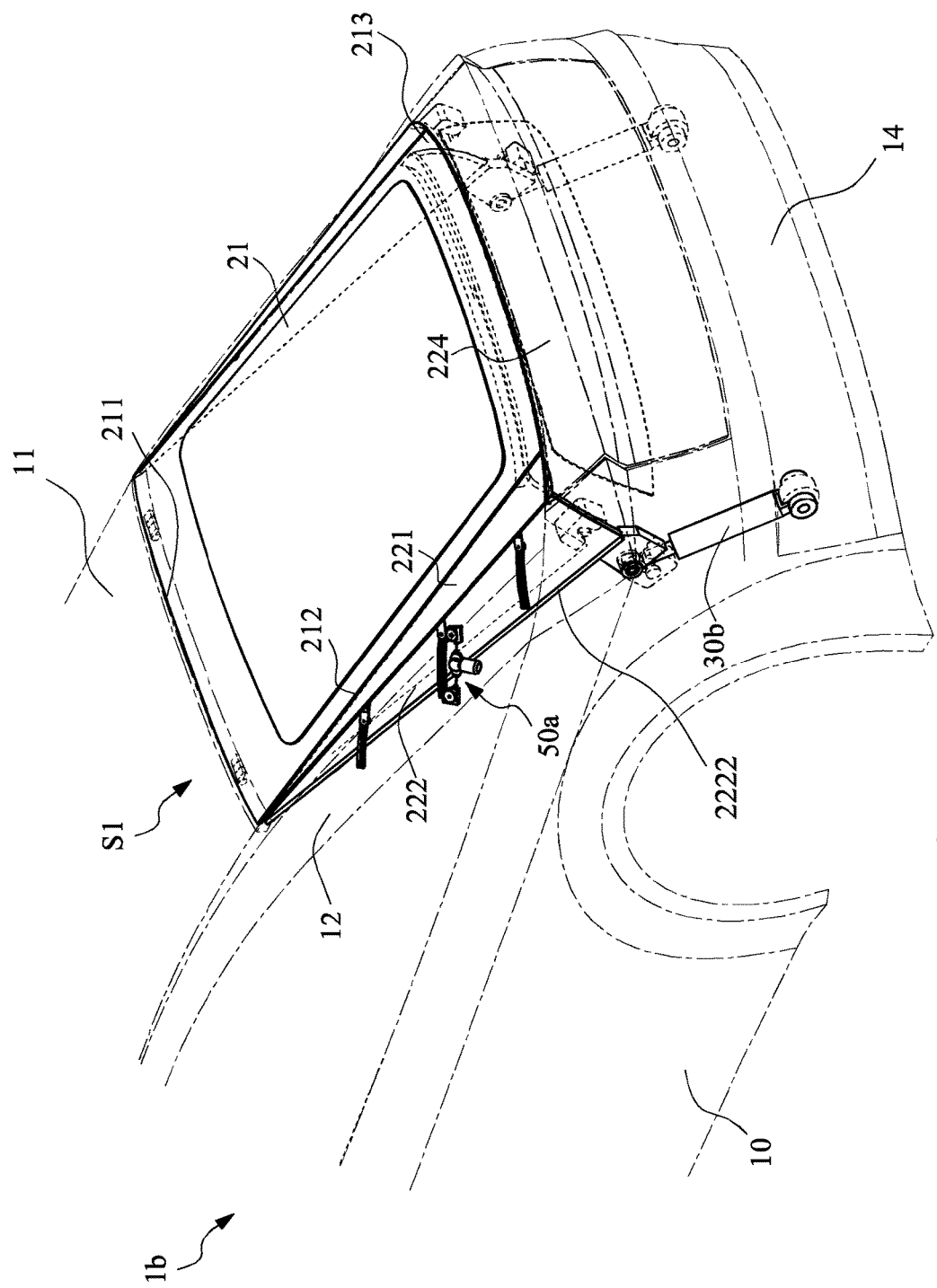
FIG. 16 is a schematic diagram of a third embodiment of the multi-purpose vehicle in fastback state.
Figure 17:
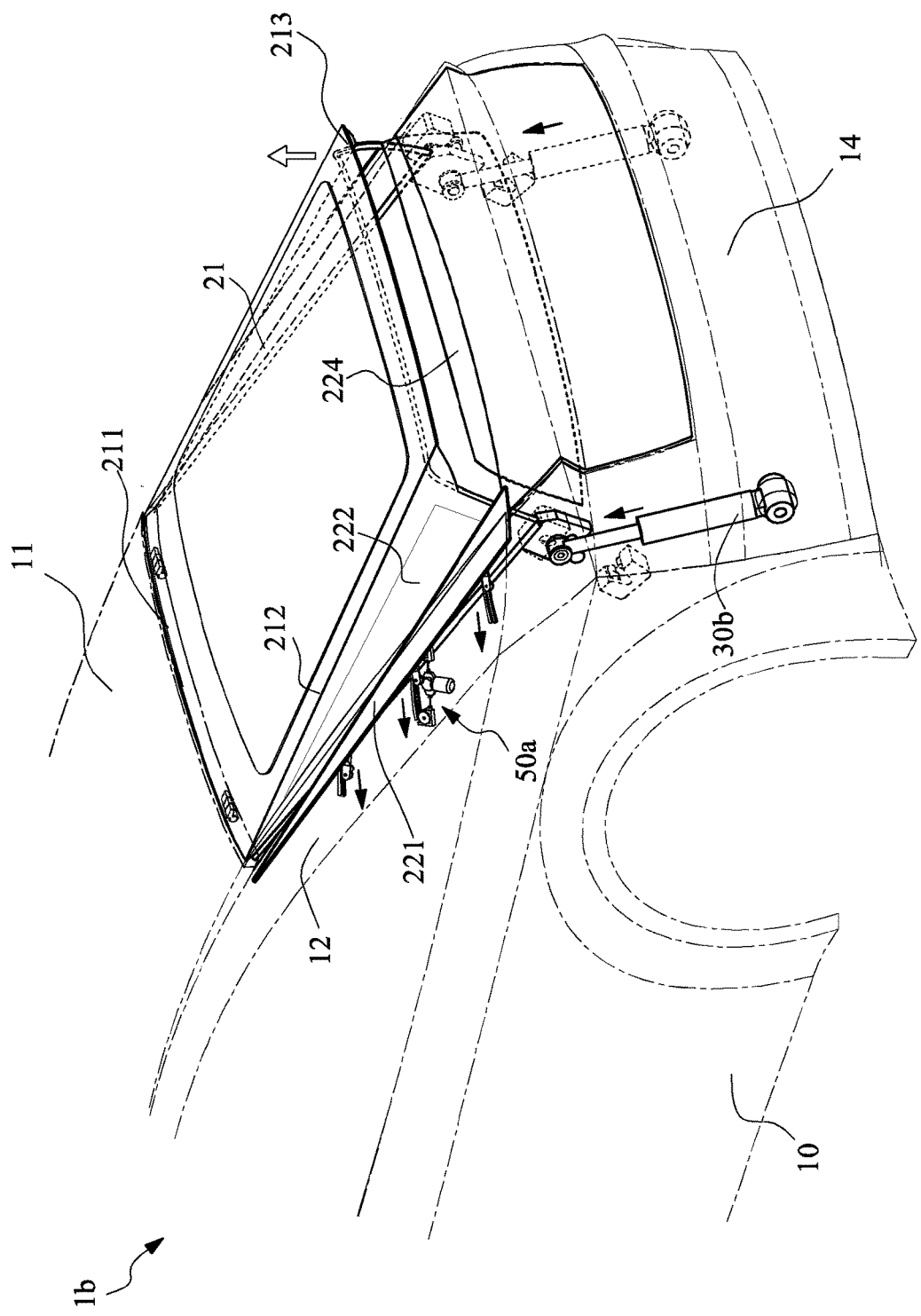
FIG. 17 is a schematic diagram of a third embodiment of the multi-purpose vehicle converted from fastback state to wagon state.
Figure 18:
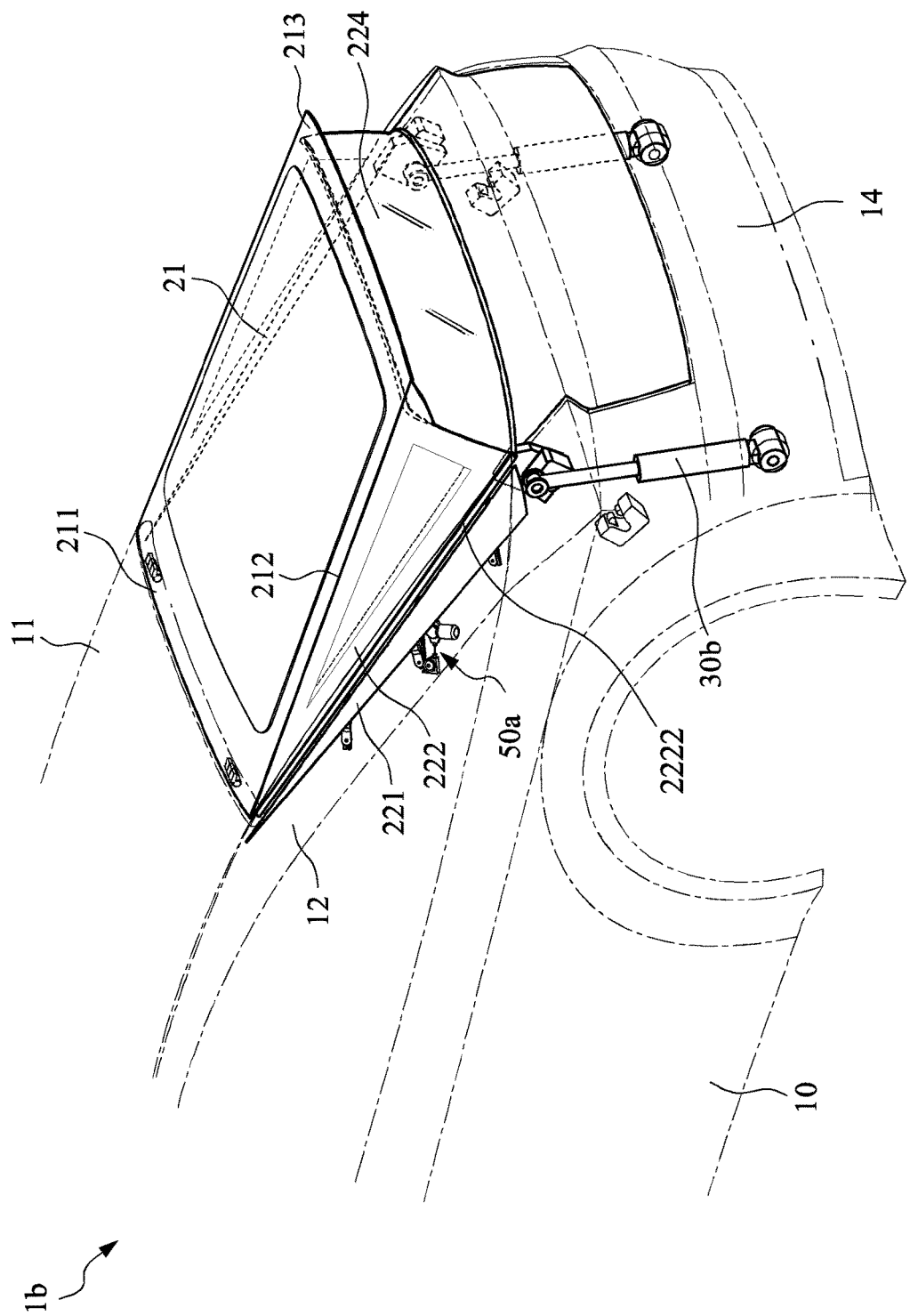
FIG. 18 is a schematic diagram of a third embodiment of a multi-purpose vehicle in wagon state.

For the following, please refer to FIGS. 16-18 for the third embodiment of the multi-purpose vehicle according to the present invention.

As shown in FIG. 16, when the multi-purpose vehicle 1b is in fastback vehicle state S1, the first moving panel 221 is in contact with the C-pillar 12, and the second moving panel 222 is contained in the vehicle body 10 as shown in FIG. 17. And when the multi-purpose vehicle 1b is converted into wagon state S2 from fastback state S1, the first moving panel 221 is driven by the second driving device 50a, and moves transversely towards the inner side of the C-pillar 12, until it's separated from the main body 21. Meanwhile, the second moving panel 222 is driven by the driving device 30b to move up, until the fourth connecting end 2222 is connected with the C-pillar 12. At this moment, the first moving panel 221 is completely hidden behind C-pillar 12, forming a wagon state S2 as shown in FIG. 18. It should be noted that, as shown in FIG. 18, wherein the multi-purpose vehicle 1b is different from the multi-purpose vehicle 1 in that, the second moving panel 222 is relatively still to the main body 21 (one-piece), and the first moving panel 221 can be completely separated from the main body 21 in this embodiment. The second driving device 50a of the first moving panel 221 is similar to a three-rail window regulator, it needs to be noted that, the embodiment states of the first driving device 30 and the second driving device 50 are not limited by the disclosed embodiments, manual or wireless driving methods belong to the application scope of the invention.

It should be noted that the above are merely embodiments, the invention is not limited by these embodiments. According to the invention, various changes and modifications can be made without departing from the spirit and essence of the present invention by those skilled in the art, and the corresponding changes and modifications can all belong to the protection scope of the claims appended to the invention.

The invention claimed is:

1. A type of multi-purpose vehicle with a fastback state and a wagon state, and is characterized in that, the multi-purpose vehicle comprises: a vehicle body and a main liftback body,
   the vehicle body comprises:
      a roof;
      a tail;
      a C-pillar; and
      a tailgate window in a trapezoid shape;
   the main liftback body comprises: a main body and a moving assembly,
      the main body comprises:
         an engaging end which is connected with the roof;
         a free end; and
         a first end;
      the moving assembly connected with the first end comprises:
         a) a first moving panel which is a triangular cover;
         b) a second moving panel; and
         c) a linkage device comprising: a linkage rod and a linkage piece that can position the first moving panel through a sliding surface, whereby, the linkage device can simultaneously position the main body, the first moving panel, and the second moving panel while keeping shut lines constant,
   wherein, the tailgate window can move up to be connected with the free end, or can move down and stored inside the tail, while the free end is connected with the tail, furthermore, a first driving device housed in the vehicle body drives the main liftback body to move relative to the C-pillar, therefore, the multi-purpose vehicle can be converted between the fastback state and the wagon state.

2. The multi-purpose vehicle according to claim 1 is characterized in that, the engaging end is pivotally connected with the roof through a first hinges, and the linkage piece is pivotally connected with the second moving panel through a plurality of second hinges, wherein the central axes of the second hinges' intersecting point lies on the central axis of the first hinges.

3. A type of multi-purpose vehicle with a fastback state and a wagon state, and is characterized in that, the multi-purpose vehicle comprises a vehicle body and a main liftback body,
   the vehicle body comprises:
      a roof;
      a tail;
      a C-pillar; and
      a tailgate window in a trapezoid shape;
   the main liftback body comprises a main body and a moving assembly,
      the main body comprises:
         an engaging end connected with the roof;
         a free end; and
         a first end,
      the moving assembly comprises:
         a) a first moving panel which is triangular, comprises:
         a first connecting end which is connected with the first end; and
         a second connecting end;
         b) a second moving panel which is relatively still to the main body; and
         c) a second driving device to drive the first moving panel, so that the second connecting end can be selectively connected with the second moving panel or the C-pillar,
   wherein, the tailgate window can move up to be connected with the free end, or can move down and stored inside the tail, while the free end is connected with the tail, furthermore, a first driving device housed in the vehicle body drives the main liftback body to move relative to the C-pillar, therefore, the multi-purpose vehicle can be converted between the fastback state and the wagon state.

4. The multi-purpose vehicle according to claim 3 is characterized in that, the second moving panel comprises a third connecting end and a fourth connecting end, when the multi-purpose vehicle is in the fastback state, the first moving panel is driven by the second driving device, to make the second connecting end separated from the third connecting end, and connected with the C-pillar, meanwhile, the free end is also connected with the tail, forming a sealed state.

5. The multi-purpose vehicle according to claim 4 is characterized in that, when the multi-purpose vehicle is in the wagon state, the second connecting end is connected with the third connecting end; the fourth connecting end is connected with the C-pillar.

6. A type of multi-purpose vehicle with a fastback state and a wagon state, and is characterized in that, the multi-purpose vehicle comprises a vehicle body and a main liftback body,
   the vehicle body comprises:
      a roof;
      a tail;
      a C-pillar; and a tailgate window in a trapezoid shape;
the main liftback body comprises a main body and a moving assembly,
    the main body comprises:
        an engaging end connected with the roof;
        a free end; and
        a first end,
    the moving assembly comprises:
        a) a first moving panel which is triangular; and
        b) a second moving panel which is relatively still to the main body;

wherein, a second driving device drives the first moving panel to be detached from the first end, and hidden behind the C-pillar during the wagon state, and the tailgate window can move up to be connected with the free end, or can move down and stored inside the tail, while the free end is connected with the tail, furthermore, a first driving device housed in the vehicle body drives the main liftback body to move relative to the C-pillar, therefore, the multi-purpose vehicle can be converted between the fastback state and the wagon state.

7. The multi-purpose vehicle according to claim 6 is characterized in that, the first moving panel comprises a first connecting end and a second connecting end, when the multi-purpose vehicle is in the fastback state, the first moving panel is moved out behind the C-pillar until the first connecting end is connected with the first end, the second connecting end is connected with the C-pillar, and the free end is also connected with the tail forming a sealed state.

\* \* \* \* \*